US008826893B2

(12) United States Patent
Marsh et al.

(10) Patent No.: US 8,826,893 B2
(45) Date of Patent: Sep. 9, 2014

(54) THERMAL MANAGEMENT SYSTEMS AND METHODS

(75) Inventors: Gregory Alan Marsh, Erie, PA (US); Mahesh Aggarwal, Erie, PA (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 13/233,126

(22) Filed: Sep. 15, 2011

(65) Prior Publication Data

US 2012/0180768 A1 Jul. 19, 2012

Related U.S. Application Data

(60) Provisional application No. 61/433,085, filed on Jan. 14, 2011.

(51) Int. Cl.
*F02B 33/00* (2006.01)
*F01P 3/20* (2006.01)

(52) U.S. Cl.
CPC ........................................ *F01P 3/20* (2013.01)
USPC ...................... 123/563; 123/41.29; 123/559.1; 60/599

(58) Field of Classification Search
CPC ............. F02B 29/0406; F02B 29/0412; F02B 29/0425; F02B 29/0431; F02B 29/0437; F02B 29/0443; F02B 29/0493
USPC ........ 123/563, 540, 542, 41.29, 41.49, 41.51; 60/599, 610, 612, 598; 180/68.1–68.4
See application file for complete search history.

(56) References Cited

U.S. PATENT DOCUMENTS

| 4,104,999 | A |   | 8/1978 | Ullrich |
| 4,930,460 | A |   | 6/1990 | Aihara et al. |
| 5,394,854 | A | * | 3/1995 | Edmaier et al. ............... 123/563 |
| 5,598,705 | A | * | 2/1997 | Uzkan ............................ 60/599 |
| 5,910,099 | A | * | 6/1999 | Jordan et al. .................... 60/599 |
| 6,098,576 | A |   | 8/2000 | Nowak, Jr. et al. |
| 6,145,480 | A |   | 11/2000 | Betz et al. |
| 6,293,264 | B1 |   | 9/2001 | Middlebrook |

(Continued)

FOREIGN PATENT DOCUMENTS

| DE | 102005053500 B3 | 5/2007 |
| EP | 1342892 A2 | 9/2003 |

OTHER PUBLICATIONS

Search Report and Written Opinion from corresponding PCT Application No. PCT/US2011/066408 dated Sep. 19, 2012.

(Continued)

*Primary Examiner* — Hung Q Nguyen
(74) *Attorney, Agent, or Firm* — GE Global Patent Operation; John A. Kramer (57) ABSTRACT

Thermal management systems and methods related to controlling temperature of internal combustion engines are provided. In one embodiment, a thermal management system includes an air intake structure defining an air intake passage therethrough coupled to a plurality of cylinders in an engine, a multi-stage cooling assembly, positioned in the air intake passage, including an air-to-coolant intercooler for cooling intake air and an air-to-air heat exchanger for cooling intake air, an air-to-coolant radiator fluidly coupled with the air-to-coolant intercooler of the multi-stage cooling assembly, a first fan operable to provide air flow to the multi-stage cooling assembly and the air-to-coolant radiator, and a second fan operable to provide air flow to the air-to-coolant radiator.

14 Claims, 7 Drawing Sheets

(56) References Cited

U.S. PATENT DOCUMENTS

| | | |
|---|---|---|
| 6,604,515 B2 | 8/2003 | Marsh et al. |
| 7,040,303 B2 | 5/2006 | Uzkan et al. |
| 7,533,636 B2 | 5/2009 | Marsh et al. |
| 7,694,654 B2 | 4/2010 | Hoi et al. |
| 7,703,284 B2 | 4/2010 | Becker et al. |
| 7,703,420 B1 | 4/2010 | Meissner et al. |
| 7,757,678 B2 | 7/2010 | Marsh et al. |
| 7,798,134 B2 | 9/2010 | Marsh et al. |
| 2001/0029907 A1* | 10/2001 | Algrain et al. ............. 123/41.29 |
| 2002/0109970 A1 | 8/2002 | Yang et al. |
| 2008/0041556 A1 | 2/2008 | Braun et al. |
| 2008/0092861 A1 | 4/2008 | Duffy et al. |
| 2010/0192890 A1 | 8/2010 | Brooks et al. |
| 2010/0263369 A1 | 10/2010 | Kardos et al. |
| 2011/0000469 A1 | 1/2011 | Lauberts et al. |
| 2011/0023796 A1 | 2/2011 | Cattani et al. |
| 2011/0088668 A1 | 4/2011 | Kardos et al. |
| 2011/0139131 A1 | 6/2011 | Kardos et al. |
| 2012/0255296 A1 | 10/2012 | Phillips et al. |
| 2013/0074812 A1 | 3/2013 | Brooks et al. |

OTHER PUBLICATIONS

Marsh, Gregory A. et al., "Thermal Management Systems and Methods," U.S. Appl. No. 13/233,147, filed Sep. 15, 2011, 56 pages.
Marsh, Gregory A. et al., "Thermal Management Systems and Methods," U.S. Appl. No. 13/233,207, filed Sep. 15, 2011, 53 pages.
Non-Final Rejection dated Jul. 22, 2013.
Non-Final Rejection dated Oct. 23, 2013.
Final Rejection dated Feb. 27, 2014.

* cited by examiner

THERMAL MANAGEMENT SYSTEMS AND METHODS

CROSS-REFERENCE TO RELATED APPLICATIONS

This application claims priority to U.S. Provisional Patent Application No. 61/433,085, entitled "THERMAL MANAGEMENT SYSTEM AND METHOD," filed Jan. 14, 2011, the disclosure of which is hereby incorporated by reference in its entirety and for all purposes.

FIELD

The subject matter disclosed herein relates to thermal management systems and methods.

BACKGROUND

Various approaches and configurations can be employed for controlling temperature in an internal combustion engine. Typically, different fluids are circulated through an internal combustion engine to reject heat from various components in order to control temperature. For example, engine coolant (i.e., liquid fluid) may be circulated through an internal combustion engine to control engine temperature in what is referred to as a water-cooled engine. Furthermore, air (i.e., gaseous fluid) may be provided to an internal combustion engine to control engine temperature. For example, air is directed to flow directly over hot parts of an internal combustion engine to cool them in what is referred to as an air-cooled engine.

In one approach, both engine coolant and air are employed in controlling engine temperature. In particular, engine coolant is circulated through a coolant jacket formed in an engine block to reject heat from cylinders during engine operation. Heated engine coolant from the coolant jacket is circulated through an air-to-coolant radiator. A fan is coupled to the air-to-coolant radiator to circulate air across an exterior surface of the air-to-coolant radiator to reject heat from coolant flowing through the air-to-coolant radiator.

BRIEF DESCRIPTION OF THE INVENTION

However, the inventors herein have identified issues with the above described approach. For example, while this approach may be suitable to control temperature in some internal combustion engine configurations, such as naturally-aspirated engines, the approach does not provide heat rejection capabilities suitable for higher compression engines, such as a turbo-charged engine that has increased heat rejection requirements. If the above described approach were applied to a turbocharged engine, increased temperatures from residual heat potentially would destabilize combustion (e.g., pre-detonation), increase emissions, and cause engine component degradation.

In one embodiment, a thermal management system includes an air intake structure defining an air intake passage therethrough coupled to a plurality of cylinders in an engine, a multi-stage cooling assembly, positioned in the air intake passage, including an air-to-coolant intercooler for cooling intake air and an air-to-air heat exchanger for cooling intake air, an air-to-coolant radiator fluidly coupled with the air-to-coolant intercooler of the multi-stage cooling assembly to form an engine coolant cooling circuit, a first fan operable to provide air flow to the multi-stage cooling assembly and the air-to-coolant radiator, and a second fan operable to provide air flow to the air-to-coolant radiator.

By providing air flow from two fans to cool intake air and engine coolant, heat rejection capabilities of the thermal management system may be increased. In this way, engine temperature control accuracy may be increased.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventor herein has recognized any identified issues and corresponding solutions.

BRIEF DESCRIPTION OF THE DRAWINGS

The present invention will be better understood from reading the following description of non-limiting embodiments, with reference to the attached drawings, wherein below.

DETAILED DESCRIPTION

The present description relates to assemblies, systems, and methods for thermal management of an internal combustion engine. More particularly, the present description relates to controlling a flow or circulation of different fluids through different cooling circuits to adjust internal combustion engine temperatures based on different operating parameters.

As used herein, fluid refers to a thermal transport liquid, semi-liquid material, or gas. Examples of suitable fluid include water, glycols, salt solutions, alcohols, intake air, exhaust gas, and mixtures of two or more of the foregoing. In some implementations, more exotic materials and/or performance affecting additives are contemplated, to include corrosion resistors, defoamers, anti-sludge agents, detergents, anti-gelling agents, biocidal agents, leak preventers (such as silicates) or locators (such as dye), anti-freezing agents (such as the above mentioned glycols and alcohols), and the like.

In one implementation, a thermal management system comprises a multi-stage cooling assembly including an air-to-coolant intercooler for cooling intake air and an air-to-air heat exchanger for cooling intake air. The air-to-coolant intercooler of the multi-stage cooling assembly fluidly couples with an air-to-coolant radiator to form an engine coolant cooling circuit. The thermal management system includes a first fan that is operable to provide air flow to the multi-stage cooling assembly and the air-to-coolant radiator and a second fan that is operable to provide air flow to the air-to-coolant radiator. The first and second fans are independently operable to adjust air flow provided by each fan independent of the other fan. By providing different fans that are independently operable, air flow provided to different structures or cooling circuits may be adjusted separately.

For example, since the first fan provides air flow to the air-to-air heat exchanger of the multi-stage cooling assembly, operation of the first fan may be adjusted to adjust air flow based on manifold air temperature. As another example, since the second fan provides air flow to the air-to-coolant radiator, operation of the second fan may be adjusted to adjust air flow based on a second operating parameter such as engine coolant temperature. The above described implementation may enable different fluid cooling circuits to be controlled independently. Accordingly, the thermal control accuracy is increased.

In another implementation, an internal combustion engine operates with a Miller cycle combustion process where a combustion stroke is reduced to enable a higher overall cylinder pressure, and a resulting increase in operating efficiency. To compensate for a potential reduction in power output due to the reduced compression stroke of the Miller cycle, the internal combustion engine comprises a two-stage turbocharger configuration that increases pressure of charge air entering cylinders of the internal combustion engine. The two-stage turbocharger configuration generates additional heat relative to a single turbocharger or naturally aspirated configuration.

To suitably handle the heat generated from the two-stage turbocharger configuration, a thermal management system includes a multi-stage cooling assembly that is positioned in between a compressor of the first turbocharger and a compressor of the second turbocharger. The multi-stage cooling assembly includes an air-to-coolant intercooler for cooling intake air and an air-to-air heat exchanger for cooling intake air. An air-to-air heat exchanger is positioned between the compressor of the second turbocharger and the engine cylinders. An air-to-coolant radiator is fluidly coupled with the air-to-coolant intercooler of the multi-stage cooling assembly to form an engine coolant cooling circuit.

By providing the multi-stage cooling assembly at the outlet of the first compressor and the air-to-air intercooler at the outlet of the second compressor, intake charge air is cooled as pressure is increased by each turbocharger stage. Accordingly, heat rejection capability of the thermal management system is increased relative to a single air-to-air intercooler configuration. Furthermore, in some implementations, air charge temperature is controlled according to operating conditions by adjusting air flow provided across the air-to-air heat exchanger of the multi-stage cooling assembly and the air-to-air intercooler. Moreover, additional air charge temperature control is achieved by adjusting a flow rate and/or temperature of engine coolant flowing through the air-to-coolant intercooler of the multi-stage cooling assembly. The ability to adjust air flow, coolant flow (or temperature), or both air flow and coolant flow (or temperature) enables increased temperature control accuracy of charge air entering the engine cylinders to provide suitable thermal management across the operating range of the internal combustion engine.

In another implementation, a multi-stage cooling assembly comprises a body forming an air inlet and an air outlet. A plurality of exterior fins extends outward from an exterior of the body. The plurality of exterior fins differs as a function of the location of the plurality of exterior fins relative to the exterior of the body. For example, the plurality of exterior fins may differ in fin type, fin density, or both fin type and fin density. A resulting distribution of the plurality of exterior fins creates a pressure drop in a flow of air translating across the plurality of exterior fins that distributes airflow across the exterior of the body in a determined amount. The multi-stage cooling assembly further comprises an air-to-coolant intercooler positioned in an interior of the body and adjacent the air inlet.

By employing differing exterior fins to distribute air flowing across the exterior of the body of the multi-stage cooling assembly, heat extracted from charge air traveling through the interior of the body is transferred across a greater surface area of the body. Accordingly, heat rejection capability of the multi-stage cooling assembly is increased. Furthermore, since the multi-stage cooling assembly employs various fluids (e.g., air and engine coolant) for cooling charge air, a higher resolution of temperature control is achieved through adjustment of the fluids.

Figure 1:
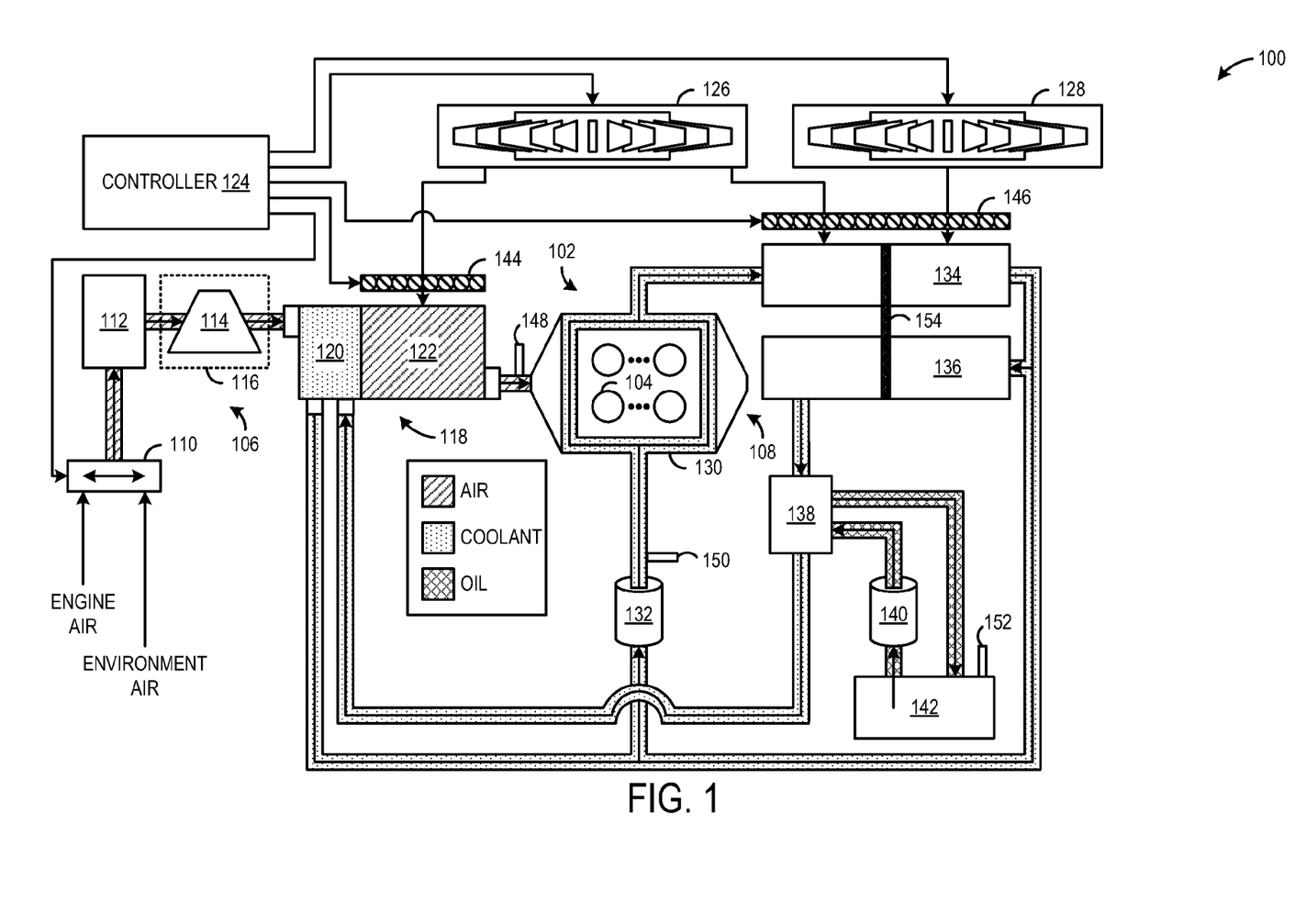
FIG. 1 schematically shows an embodiment of a thermal management system.

FIG. 1 shows an embodiment of a thermal management system 100 that is operable to control temperatures of fluids and components of an internal combustion engine 102. The engine 102 includes a plurality of cylinders 104, an air intake structure 106, and an exhaust structure 108. In some implementations, the thermal management system 100 and the engine 102 are coupled to a vehicle. For example, the vehicle may include a locomotive, marine vessel, mining haul truck, other off-highway vehicle (OHV), etc. In some embodiments, the thermal management system 100 and the engine 102 are stationary, such as when incorporated into a power plant or generator. In some implementations, the engine 102 is a diesel engine.

The air intake structure 106 couples to the plurality of cylinders 104 and defines an air intake passage therethrough. Intake air (a.k.a. intake air charge, combustion air, etc.) is delivered to the plurality of cylinders 104 through the air intake passage for combustion. A plurality of thermal management components are positioned in the intake passage to control the temperature and pressure of intake air flowing through the passage. The illustrated implementation includes an air intake door 110, an air filter 112, a compressor 114 of a turbocharger 116, and a multi-stage cooling assembly 118 positioned in the air passage of the air intake structure 106.

The air intake door 110 is coupled to the air intake structure 106. The air intake door 110 is operable to vary combustion intake air temperatures based on operating conditions. In particular, the air intake door 110 is adjustable to at least a first position that connects the air intake passage with an engine compartment to provide intake air from the engine compartment to the air intake passage. Furthermore, the air intake door 110 is adjustable to a second position that connects the air intake passage with environment outside of the engine compartment to provide ambient environment air to the air intake passage. By adjusting the air intake door 110 to the first position to provide intake air from the engine compartment, combustion intake air temperature is increased. By adjusting the air intake door 110 to the second position to provide intake air from the ambient environment, combustion intake air temperature is decreased.

In some implementations, the air intake door 110 is manually adjustable between at least the first position and the second position. In some implementations, the air intake door 110 is automatically adjustable between at least the first position and the second position. In particular, a controller 124 is configured to adjust the air intake door 110 between the first position and the second position based on an operating parameter. For example, the controller 124 may be configured to adjust the air intake door 110 based on intake air temperature. As a particular example, during an engine startup condition, the air intake door 110 is adjusted to the first position to supply warmer intake air from the engine compartment to heat the engine 102. Correspondingly, once the engine has been suitably heated, the air intake door 110 is adjusted to the second position to provide cooler ambient intake air for combustion. As another example, the controller may be configured to adjust the air intake door 110 based on ambient environment temperature. As a particular example, during winter conditions where ambient environment temperature is low, the air intake door 110 is adjusted to the first position to increase engine combustion air intake temperature. The increased intake air temperature reduces the combustion intake air charge density and reduces the combustion pressure on the engine cylinders, which may be more prone to degradation in low temperature. Furthermore, the increased intake air temperature aids in melting any ice or snow that is present in the intake air passage.

The air filter 112 is positioned in the air intake passage defined by the air intake structure 106 downstream from the air intake door 110. The air filter 112 prevents abrasive particulate matter from entering the plurality of cylinders 104 and maintains clean combustion air for the engine 102.

The turbocharger 116 includes the compressor 114 which is positioned in the air intake passage defined by the air intake structure 106, and a turbine (not shown) which is positioned in an exhaust passage that is coupled to the engine 102. The turbine is coupled to the compressor 114 so that the compressor is driven by exhaust gas that spins the turbine. The compressor 114 increases the pressure of combustion air that flows from the air filter 112. The pressure increase of combustion air by the compressor 114 increases charge density of combustion air entering the plurality of cylinders 104. Moreover, increasing the pressure of the combustion air also increases a temperature of the combustion air.

A multi-stage cooling assembly 118 is positioned downstream from the compressor 114 in the air intake passage defined by the air intake structure 106. The multi-stage cooling assembly 118 rejects heat from the combustion air through transfer to different fluids. In particular, the multi-stage cooling assembly 118 includes an air-to-coolant intercooler 120 and an air-to-air heat exchanger 122 that in combination provide heat rejection to the combustion air. In the illustrated implementation, the air-to-coolant intercooler 120 is positioned adjacent an inlet of the multi-stage cooling assembly 118. Combustion air entering the multi-stage cooling assembly 118 initially flows across a surface of the air-to-coolant intercooler 120 causing heat to be transferred from the combustion air to engine coolant flowing through the air-to-coolant intercooler 120. The combustion air continues through the multi-stage cooling assembly 118 to the air-to-air heat exchanger 122.

The air-to-air heat exchanger 122 includes interior fins that, depending on implementation, differ in fin type, fin density, or both fin type and fin density as a function of the location of the interior fins relative to the interior of the air-to-air heat exchanger 122. The differing interior fin type and/or density aid in forming a combustion air path through the air-to-air heat exchanger 122 that distributes or balances the combustion air through the interior a determined amount. Heat is directly rejected from combustion air through the interior fins to the atmosphere. Furthermore, the air-to-air heat exchanger 122 includes exterior fins that, depending on implementation, differ in fin type, fin density, or both fin type and fin density as a function of the location of the exterior fins relative to the exterior of the air-to-air heat exchanger 122. The differing exterior fin type and/or density aid in distributing air flow across the air-to-air heat exchanger 122 so that air flows across a greater portion of the surface area of the air-to-air heat exchanger 122 to increase heat rejection capabilities.

A first fan 126 is operable to provide air flow to the multi-stage cooling assembly 118. In particular, air flow from the first fan 126 is directed through the exterior fins of the air-to-air heat exchanger 122 to draw heat from the fins to the atmosphere. In some implementations, operation of the first fan 126 is adjustable by the controller 124 based on different operating conditions. For example, in one implementation, the controller 124 is operable to adjust a speed of the first fan 126 to adjust air flow provided by the first fan. As another example, the controller 124 is operable to adjust a fan blade pitch of the first fan 126 to adjust air flow provided by the first fan. In some implementations, operation of the first fan 126 operates with limited or no adjustment. For example, the first fan 126 may be turned on or off without speed or fan blade pitch adjustment. As another example, the first fan 126 is driven by the engine 102 so that it operates as long as the engine is running.

In an embodiment, a first cooling shutter 144 is positioned between the multi-stage cooling assembly 118 and the first fan 126. The first cooling shutter 144 is adjustable to adjust air flow provided to the multi-stage cooling assembly 118. For example, the first cooling shutter 144 can be closed to prevent air flow provided by the first fan 126 from reaching the multi-stage cooling assembly 118. Furthermore, the first cooling shutter 144 provides natural convention heat exchanger loss reduction when closed. On the other hand, the first cooling shutter 144 can be opened to allow air flow provided by the first fan 126 to reach the multi-stage cooling assembly 118. In some implementations, a degree of opening of the first cooling shutter 144 can be variably adjusted to different positions between opened and closed to throttle air flow to allow a desired amount of air to reach the multi-stage cooling assembly 118. Such cooling shutter control may be implemented with fans that are not adjustable to provide increased air flow control capability. In some implementations, the controller 124 adjusts the first cooling shutter 144 to control air flow provided to the multi-stage cooling assembly 118 based on operating conditions. For example, the controller is operable to close the first cooling shutter when an engine temperature is below a first designated threshold. By closing the cooling shutter during such conditions, overcooling of combustion air is reduced, thus allowing the combustion air to heat to a suitable operating temperature more quickly.

The multi-stage cooling assembly 118 provides hybrid cooling of combustion air through control of two different fluids. In particular, flow of both engine coolant and air can be manipulated to control the temperature of combustion air. The multi-stage cooling assembly 118 integrates the air-to-coolant intercooler 120 with the air-to-air heat exchanger 122 to reduce the overall pipe structure and intercooler length to provide a smaller footprint. The multi-stage cooling assembly 118 will be discussed in further detail below with reference to FIGS. 5-6.

Under some conditions, the multi-stage cooling assembly 118 may provide combustion air heating as desired. For example, during low engine load and low ambient temperature operation, low combustion air temperature can destabilize or cause incomplete combustion, which increases particulate matter and emissions. During such conditions, the engine 102 may heat engine coolant to a temperature that is greater than an ambient temperature. Correspondingly, the engine coolant flowing through the air-to-coolant intercooler 120 heats combustion air flowing through the air-to-coolant intercooler 120. For example, during a first, low temperature condition the air-to-coolant intercooler 120 is operable to heat intake air and during a second, high temperature condition the air-to-coolant intercooler 120 is operable to cool intake air. The low temperature condition and the high temperature condition may be defined by any suitable engine temperature thresholds. In other words, the flow of engine coolant through the air-to-coolant intercooler 120 provides passive combustion air heating during low engine load and low ambient temperature conditions. During some conditions, such as transient power changes, the air-to-coolant intercooler 120 acts as a temperature moderator/damper/stabilizer to manifold air temperature due to the temperature inertia of liquid coolant flowing through the air-to-coolant intercooler 120.

In the illustrated implementation, the multi-stage cooling assembly 118, the first fan 126, and the first cooling shutter 144 forms a combustion air cooling group for cooling combustion air. Pressurized combustion air exiting the multi-stage cooling assembly 118 flows through an engine manifold of the engine 102 and is delivered to the plurality of cylinders 104 for combustion.

Continuing with FIG. 1, thermal management of the engine 102 is further controlled by an engine coolant circuit. For example, engine coolant circulates through a water jacket 130, which is fluidly coupled with a first air-to-coolant radiator 134, which is fluidly coupled with a second air-to-coolant radiator 136, which is fluidly coupled with a coolant-to-oil cooler 138, which is fluidly coupled with the air-to-coolant intercooler 120 to form the engine coolant cooling circuit. Engine coolant is pumped through the engine coolant circuit by a coolant pump 132. In some implementations, the coolant pump 132 is a single rotor engine driven coolant pump.

The water jacket 130 is formed in an engine block surrounding the plurality of cylinders 104. Heat is rejected from the plurality of cylinders 104 through cylinder walls to engine coolant flowing through the water jacket 130. The heated engine coolant flows from the water jacket 130 to the first air-to-coolant radiator 134, where the engine coolant circulates through various tubes of the first air-to-coolant radiator 134. Heat from the engine coolant is transferred to fins that are positioned between the tubes. The fins radiate the heat transferred from the tubes to the atmosphere. Engine coolant flows from the first air-to-coolant radiator 134 to the second air-to-coolant radiator 136 to further cool the engine coolant. The second air-to-coolant radiator 136 creates sub-cooled engine coolant by using slower engine coolant flow for more exposure to the radiator fins. Engine coolant can also flow from the first air-to-coolant radiator 134 to the coolant pump 132 through a passive piping flow split tee positioned between the first air-to-coolant radiator 134 and the second air-to-coolant radiator 136.

A second fan 128 is operable to provide air flow to the first air-to-coolant radiator 134 and the second air-to-coolant radiator 136. In some implementations, operation of the second fan 128 is adjustable by the controller 124 based on different operating conditions. For example, in one implementation, the controller 124 is operable to adjust a speed of the second fan 128 to adjust air flow provided by the second fan. As another example, the controller 124 is operable to adjust a fan blade pitch of the second fan 128 to adjust air flow provided by the second fan. In some implementations, operation of the second fan 128 operates with limited or no adjustment.

Furthermore, the first fan 126 is operable to provide some air flow to the first air-to-coolant radiator 134 and the second air-to-coolant radiator 136 to increase heat rejection of the engine coolant. A fixed baffle 154 forms a structure that directs air flow provided by the first fan 126 and the second fan 128. In particular, the baffle 154 passively splits air flow provided by the first fan 126 to the multi-stage cooling assembly 118 and the first and second air-to-coolant radiators 134 and 136. In some implementations, the fixed baffle 154 splits air flow provided by the first fan 126 unevenly to the multi-stage cooling assembly 118 and the first and second air-to-coolant radiators 134 and 136. For example, the fixed baffle 154 directs sixty percent of air flow provided by the first fan 126 to the multi-stage cooling assembly 118 and directs forty percent of air flow provided by the first fan 126 to the first and second air-to-coolant radiators 134 and 136. In some implementations, the fixed baffle 154 splits air flow provided by the first fan evenly to the multi-stage cooling assembly 118 and the first and second air-to-coolant radiators 134 and 136. The fixed baffle 154 directs air flow provided by the second fan 128 to the first air-to-coolant radiator 134 and the second air-to-coolant radiator 136. The fixed baffle 154 increases cooling efficiency by directing air provided by the first and second cooling fans to specific components for heat rejection from different fluids.

A second cooling shutter 146 is positioned between the first air-to-coolant radiator 134, the second air-to-coolant radiator 136, and the first fan 126 and the second fan 128. The second cooling shutter 146 is adjustable to adjust air flow provided to the first and second air-to-coolant radiators. For example, the second cooling shutter 146 can be closed to prevent air flow provided by the first fan 126 and the second fan 128 from reaching the first and second air-to-coolant radiators 134 and 136. Furthermore, the second cooling shutter 146 provides natural convention heat exchanger loss reduction when closed. On the other hand, the second cooling shutter 146 can be opened to allow air flow provided by first fan 126 and the second fan 128 to reach the first and second air-to-coolant radiators 134 and 136. In some implementations, a degree of opening of the second cooling shutter 146 can be variably adjusted to different positions between opened and closed to throttle air flow to allow a desired amount of air to reach the air-to-coolant radiators. Such cooling shutter control may be implemented with fans that are not adjustable to provide increased air flow control capability. In some implementations, the controller 124 adjusts the second cooling shutter 146 to control air flow provided to the air-to-coolant radiators. For example, the controller is operable to close the second cooling shutter when an engine coolant temperature is below a second designated threshold. Further, the controller is operable to close the first cooling shutter and the second cooling shutter when a load of the engine is below a third designated threshold. By closing the cooling shutter during such conditions, overcooling of engine coolant is reduced, thus allowing the engine coolant to heat to a suitable operating temperature more quickly.

The coolant-to-oil cooler 138 is operable to receive engine coolant from the second air-to-coolant radiator 136 in the engine coolant cooling circuit. The coolant-to-oil cooler 138 receives engine oil that is pumped from an oil pan 142 by an oil pump 140. Oil circulates through the coolant-to-oil cooler 138 and flows to the engine 102 before returning to the oil pan 142 to form an oil cooling circuit. The coolant-to-oil cooler 138 transfers heat to and from the engine coolant from and to the engine oil. The coolant-to-oil cooler 138 acts as a moderator in the oil and engine coolant circuits to drive the oil temperature toward the engine coolant temperature so that the plurality of cylinders 104 and corresponding pistons inside the engine 102 do not expand into the water jacket 130. Such moderation between engine coolant temperature and oil temperature may be particularly applicable in engine configurations in which pistons are cooled by oil jets or other application of oil for piston cooling.

Engine coolant flows from the coolant-to-oil cooler 138 to the air-to-coolant intercooler 120 to reject heat from combustion air flowing through the multi-stage cooling assembly 118 before returning to the coolant pump 132 to complete the engine coolant cooling circuit.

In the illustrated implementation, the controller 124 is a computing device, such as microcomputer that includes a processor unit, input/output ports, memory, and a data bus. The controller 124 receives various signals from sensors coupled to engine 102; the controller may be configured to use one or more of the signals as a basis for thermal control of the engine 102. For example, the controller 124 receives a manifold air temperature signal from an air temperature sensor 148, an engine coolant temperature from a coolant temperature sensor 150, and an oil temperature from an oil temperature sensor 152. The controller 124, in addition to those signals previously discussed, receives signals from other engine sensors such as engine manifold pressure, boost pressure, engine position, engine speed, engine load, air-fuel ratio, exhaust temperature, ambient temperature, etc.

The controller 124 is operable to adjust various actuators in the engine 102 based on different operating parameters received or derived from different sensor signals to control temperatures of the engine 102. For example, the controller 124 provides feedback control of the first fan 126, the second fan 128, the first cooling shutter 144, the second cooling shutter 146, and/or the air intake door 110 to adjust temperatures of the engine 102.

In some implementations, the controller 124 is operable to adjust air flow provided by the first fan 126 based on an operating parameter, such as manifold air temperature. In such implementations, a greater amount of air flow from the first fan 126 may be directed to the multi-stage cooling assembly 118 by the fixed baffle 154 for cooling combustion air relative to the air-to-coolant radiators.

In some implementations, the controller 124 is operable to adjust airflow provided by the second fan 128 based on an operating parameter, such as engine coolant temperature. In such implementations, the second fan 128 may provide a greater amount of air flow to the air-to-coolant radiators 134 and 136 of the two fans, and thus may have the greatest influence on temperature control of the engine coolant by the two fans.

In some implementations, the controller 124 is operable to adjust air flow provided by the first fan 126 and adjust air flow provided by the second fan 128 based on the same operating parameter, such as manifold air temperature. In such implementations, simplified construction and control may be desired. For example, both fans may be adjusted by the same control signal.

In some implementations, the controller 124 operates the first fan 126 independent of the second fan 128. As one example, the controller 124 is operable to adjust air flow provided by the first fan 126 based on a first operating parameter, and adjust airflow provided by the second fan 128 based on a second operating parameter different from the first operating parameter. For example, operation of the first fan 126 is adjusted based on manifold air temperature and operation of the second fan 128 is adjusted based on engine coolant temperature. Adjusting air flow provided by the first fan and the second fan may include varying a speed of driven electric motors of the fans or varying a blade pitch of the fans at constant speed of the electric fan motor. In some implementations, the controller 124 operates the first fan 126 or the second fan 128 in reverse operation for cleaning of the heat exchangers and intake system of the engine cooling package.

Furthermore, the controller 124 is operable to adjust the first cooling shutter 144 and the second cooling shutter 146 to provide thermal control of the engine 102. In some implementations, the controller 124 is operable to adjust the first cooling shutter 144 and the second cooling shutter 146 in conjunction. For example, the controller 124 closes both of the cooling shutters as long as the manifold air temperature is below a threshold temperature indicative of a desired combustion temperature. As another example, the controller 124 closes the first cooling shutter 144 and the second cooling shutter 146 during a low engine load condition. Since both engine coolant and air provided by the fans is used to control the temperature of combustion air flowing through the multi-stage cooling assembly 118, closing both of the cooling shutters has the effect of preventing overcooling of the combustion air by either of the fluids.

In some implementations, the controller 124 is operable to adjust the first cooling shutter 144 independent of adjusting the second cooling shutter 146. For example, the controller 124 closes the first cooling shutter 144 as long as the manifold air temperature is below a threshold temperature indicative of a desired combustion temperature, and closes the second cooling shutter 146 as long as the engine coolant temperature is below a threshold temperature indicative of an engine temperature that is different from the combustion temperature. Independent control of the cooling shutters enables more accurate thermal control of the engine since different components may heat up or cool down at different rates and the cooling shutter can be adjusted to accommodate the individual thermal characteristics of such components.

In some implementations, the controller 124 is operable to adjust the air intake door 110 to a first position that provides intake air from the engine compartment to the air intake passage or a second position that provides ambient environment air to the air intake passage based on operating conditions. For example, the controller 124 adjusts the air intake door 110 to the first position when ambient air is below a threshold temperature and manifold air temperature is below a threshold temperature to provide warmer air from the engine compartment to heat the combustion air. As another example, the controller 124 adjusts the air intake door 110 to the second position when manifold air temperature is above the threshold temperature to provide cooler air from the ambient environment for denser intake air charge.

In implementations that include variable compression turbochargers, such as variable geometry turbochargers, the controller 124 is operable to adjust an amount of compression produced by the compressor 114 based on an operating parameter, such as manifold air temperature. For example, the controller 124 adjusts the turbocharger 116 to increase compression to heat combustion air to a desired temperature.

Figure 2:
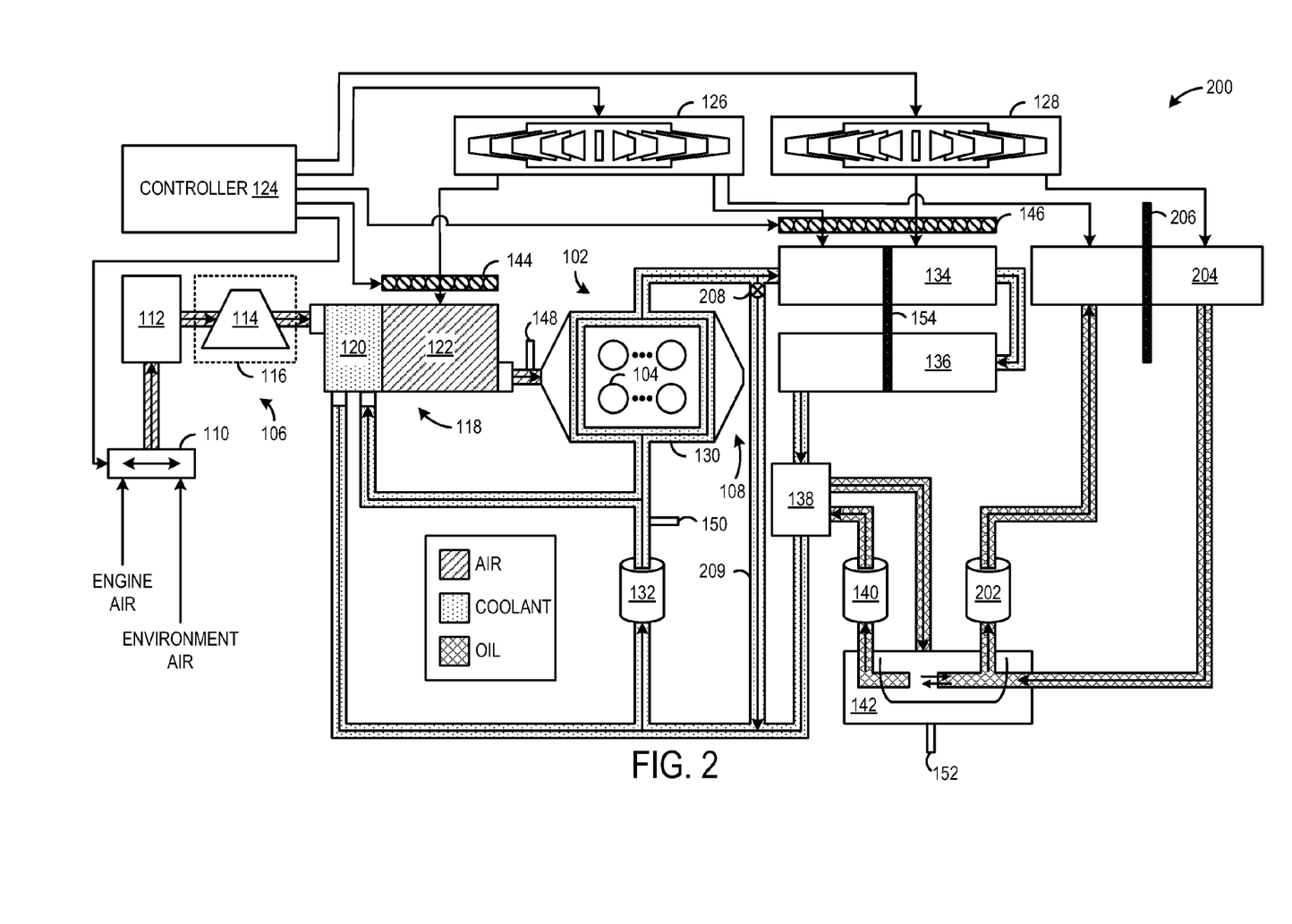
FIG. 2 schematically shows another embodiment of a thermal management system.

FIG. 2 schematically shows another embodiment of a thermal management system 200 that is operable to control temperatures of fluids and components of the internal combustion engine 102. The thermal management system 200 includes an expanded oil cooling circuit in addition to the combustion air cooling circuit and the engine coolant cooling circuit of thermal management system 100. For example, the higher capability oil cooling circuit may be employed in smaller engine layouts that have increased heat rejection requirements due to less surface area to transfer heat from oil.

Components of the thermal management system 200 that may be substantially the same as those of thermal management system 100 are identified in the same way and are described no further. However, it will be noted that components identified in the same way in different embodiments of the present disclosure may be at least partly different.

The oil cooling circuit includes the first oil pump 140 and a second oil pump 202 to pump oil from the oil pan 142. The first oil pump 140 circulates oil from the engine 102 through the coolant-to-oil cooler 138 to drive the oil temperature toward the engine coolant temperature. The second oil pump 202 circulates oil from the engine through an air-to-oil radiator 204 to reject heat from the oil through airflow across the air-to-oil radiator 204. In some implementations, the first oil pump 140 is a high pressure oil pump that pumps oil through a higher pressure oil circuit including coolant-to-oil cooler 138 and the second oil pump 202 is a low pressure oil pump that pump oil through a lower pressure oil circuit that includes the air-to-oil radiator 204. The lower pressure oil circuit operates at a lower oil pressure than the higher oil pressure circuit. In such implementations, heated oil from an internal engine oil circuit for cooling engine pistons and bearings inside the engine 102 settles in the oil pan 142 and is pumped by the low pressure oil pump 202 through the air-to-oil radiator 204 and a return line directs the cooled oil to the intake of the high pressure oil pump 140, which circulates the oil through the coolant-to-oil cooler 138 before returning to the oil pan 142. If flow of the lower pressure oil circuit returning to the oil pan 142 is higher than the flow of oil being sucked into the higher pressure oil circuit (e.g., during normal engine operation), an inlet of the higher pressure oil circuit within the oil pan 142 overflows and oil exits the inlet into the oil pan 142. If flow of the lower pressure oil circuit returning to the oil pan 142 is lower than the flow of oil being sucked into the higher pressure oil circuit (e.g., during engine startup), the inlet of the higher pressure oil circuit within the oil pan 142 does not overflow and some portion of oil in the pan oil 142 will mix with the oil returning from the lower pressure oil circuit and the higher pressure oil circuit will not starve for oil flow. In this way, oil can be sufficiently provided to both the lower pressure oil circuit and the higher pressure oil circuit even as temperature and other operating conditions vary.

In addition to the expanded oil cooling circuit, the thermal management system 200 includes an additional coolant radiator loop bypass line 209 to enhance control of engine coolant temperature across operating conditions of the engine 102. The bypass line 209 directs at least some engine coolant from the water jacket 130 to the coolant pump 132 instead of through the air-to-coolant radiator 134. A bypass valve 208 is positioned in the bypass line 209 to adjust an amount of engine coolant flow through the bypass line 209. The controller 124 is operable to adjust the state of the bypass valve 208 based on an operating parameter, such as engine coolant temperature. For example, when cool engine coolant temperature is low, such as during startup conditions, the controller 124 adjusts the bypass valve 208 to direct engine coolant through the bypass line 209 to increase the engine coolant temperature more quickly.

In the illustrated implementation, the first fan 126 is operable to provide air flow to the multi-stage cooling assembly 118, the air-to-coolant radiators 134 and 136, and the air-to-oil radiator 204. In some implementations, the fixed baffle 154 passively splits air flow provided by the first fan 126 unevenly to the multi-stage cooling assembly 118, the air-to-coolant radiators 134 and 136, and the air-to-oil radiator 204 according to fixed percentages. For example, the fixed baffle 154 directs sixty percent of air flow from the first fan 126 to the multi-stage cooling assembly 118, twenty percent of air flow from the first fan 126 to the air-to-coolant radiators 134 and 136, and twenty percent of air flow from the first fan 126 to the air-to-oil radiator 204. Such split percentages are described as one example, and it should be appreciated that airflow may be split by the fixed baffle according to any suitable percentages. The second fan 128 is operable to provide air flow to the air-to-coolant radiators 134 and 136 and the air-to-oil radiator 204. In some implementations, a second baffle 206 passively splits air flow provided by the second fan 128 to the air-to-coolant radiators 134 and 136 and the air-to-oil radiator 204. In some implementations, the air flow may be split unevenly. In some implementations, the air flow may be split evenly.

In some implementations the controller 124 adjusts air flow provided by the first fan 126, adjusts air flow provided by the second fan 128, or adjusts air flow provided by both the first fan 126 and the second fan 128 based on an oil temperature. In some implementations, the controller 124 adjusts air flow provided by the first fan 126 and the second fan 128 based on combustion air temperature, engine coolant temperature, and oil temperature.

Figure 3:
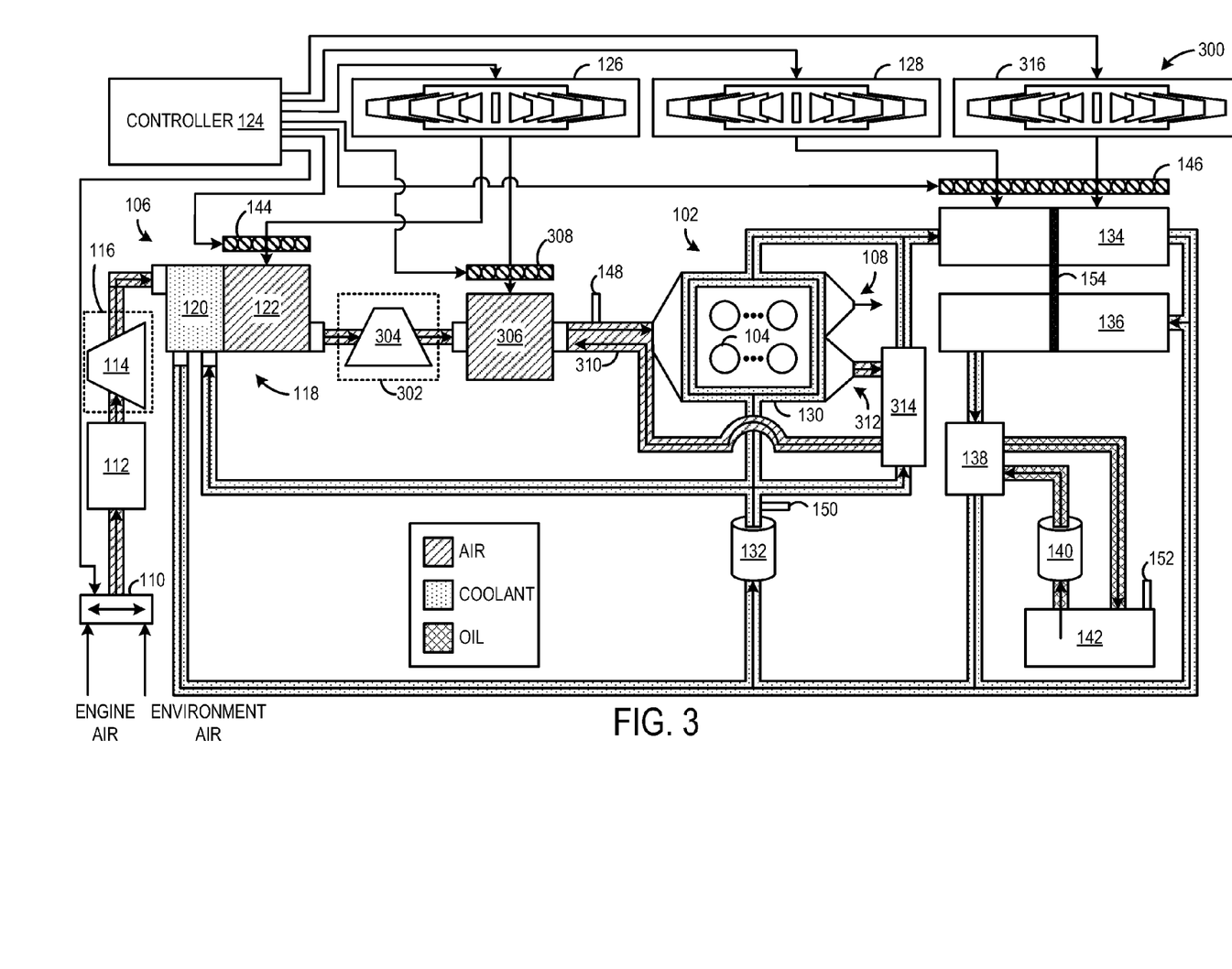
FIG. 3 schematically shows another embodiment of a thermal management system.

FIG. 3 schematically shows another embodiment of a thermal management system 300 that is operable to control temperatures of fluids and components of the internal combustion engine 102 that includes a two-stage turbocharger configuration. The thermal management system 300 rejects heat from intake air after each stage of compression from the two-stage turbocharger to reduce fuel consumption through increased intake air charge density. The engine 102 further includes an exhaust gas recirculation (EGR) configuration to mix recirculated exhaust gas with intake air for combustion. The thermal management system 300 rejects heat from recirculated exhaust gas to increase charge density of combustion air and lower combustion chamber temperatures to reduce NOx emissions. The thermal management system 300 includes a three fan configuration to provide a suitable amount of air flow to cool each of the different cooling circuits in the engine 102.

Components of the thermal management system 300 that may be substantially the same as those of thermal management system 200 are identified in the same way and are described no further. However, it will be noted that components identified in the same way in different embodiments of the present disclosure may be at least partly different.

A second turbocharger 302 including a second compressor 304 is positioned in the air intake passage formed by the air intake structure 106 downstream of the multi-stage cooling assembly 118. The second compressor 304 increases the pressure of combustion air a second time after the combustion air has been cooled by the multi-stage cooling assembly 118. An air-to-air heat exchanger 306 is positioned in the air intake passage between the second compressor 304 and the plurality of cylinders 104. The air-to-air heat exchanger 306 rejects heat from combustion air that was compressed by the second compressor 304 in order to reduce a temperature of the combustion air while maintaining an increased charge density.

The air-to-air heat exchanger 306 is provided with air flow by the first fan 126 for cooling combustion air. In the illustrated implementation, the first fan 126 is operable to provide air flow to the multi-stage cooling assembly 118 and the air-to-air heat exchanger 306. Correspondingly, the second fan 128 provides air flow to the air-to-coolant radiators 134 and 136. A third cooling shutter 308 is positioned between the air-to-air heat exchanger 306 and the first fan 126. The third cooling shutter is adjustable to adjust air flow provided to the air-to-air heat exchanger 306. For example, the controller 124 closes the third cooling shutter 308 as long as the manifold air temperature is below a temperature threshold in order to aid in heating the combustion air to a desired temperature and inhibit overcooling. In some implementations, the third cooling shutter 308 is adjusted independent of the second cooling shutter 308. For example, the third cooling shutter 308 may be adjusted based on manifold air temperature and the second cooling shutter 146 may be adjusted based on engine coolant temperature. Furthermore, a third fan 316 is operable to provide air flow to the air-to-coolant radiators 134 and 136.

Continuing with FIG. 3, a coolant-to-EGR gas intercooler 314 is positioned in the engine coolant circuit between the coolant pump 132 and the first air-to-coolant radiator 134. Engine coolant is pumped through the coolant-to-EGR gas intercooler 314 by the coolant pump 132 to cool exhaust gas that circulates through the coolant-to-EGR gas intercooler 314. The coolant-to-EGR gas intercooler 314 is fluidly positioned between an exhaust manifold 312 and an intake manifold 310. Exhaust gas exhausted by the plurality of cylinders 104 flows through the coolant-to-EGR gas intercooler 314 where it is cooled and directed to the intake manifold 310 for combustion.

In some implementations, the engine 102 operates with EGR gas being generated by designated donor cylinders. In particular, exhaust gas produced by a donor cylinder group (e.g., at least one cylinder) is recirculated to the intake manifold and exhaust gas produced by the non-donor cylinder group is directed to an exhaust pipe. In the illustrated implementation, a first exhaust structure 312 defines a first exhaust passage therethrough coupled to a first cylinder group of the plurality of cylinders 104. The first exhaust structure 312 provides exhaust gas from the first cylinder group to the intake passage through the coolant-to-EGR gas intercooler 314. A second exhaust structure 108 defines a second exhaust passage therethrough coupled to a second cylinder group of the plurality of cylinders 104. The second exhaust structure 108 provides exhaust gas from the second cylinder group to an exhaust pipe.

By recirculating exhaust gas from donor cylinders, exhaust peak pressure can be reduced for non-donor cylinders to increase combustion efficiency in the non-donor cylinders. However, recirculating exhaust gas from donor cylinders may increase combustion air charge turbulence in the intake manifold, which may result in reduced combustion consistency. To reduce turbulence in the intake manifold, the coolant-to-EGR gas intercooler 314 includes an EGR gas outlet in the intake manifold 310 that is oriented in a flow direction that opposes a flow direction of charge air exiting the air-to-air heat exchanger 306. By providing EGR gas from donor cylinders in a direction that opposes intake air, mixing of the EGR gas and the intake air may be increased over a greater distance of the intake manifold to provide more uniform combustion air.

Figure 4:
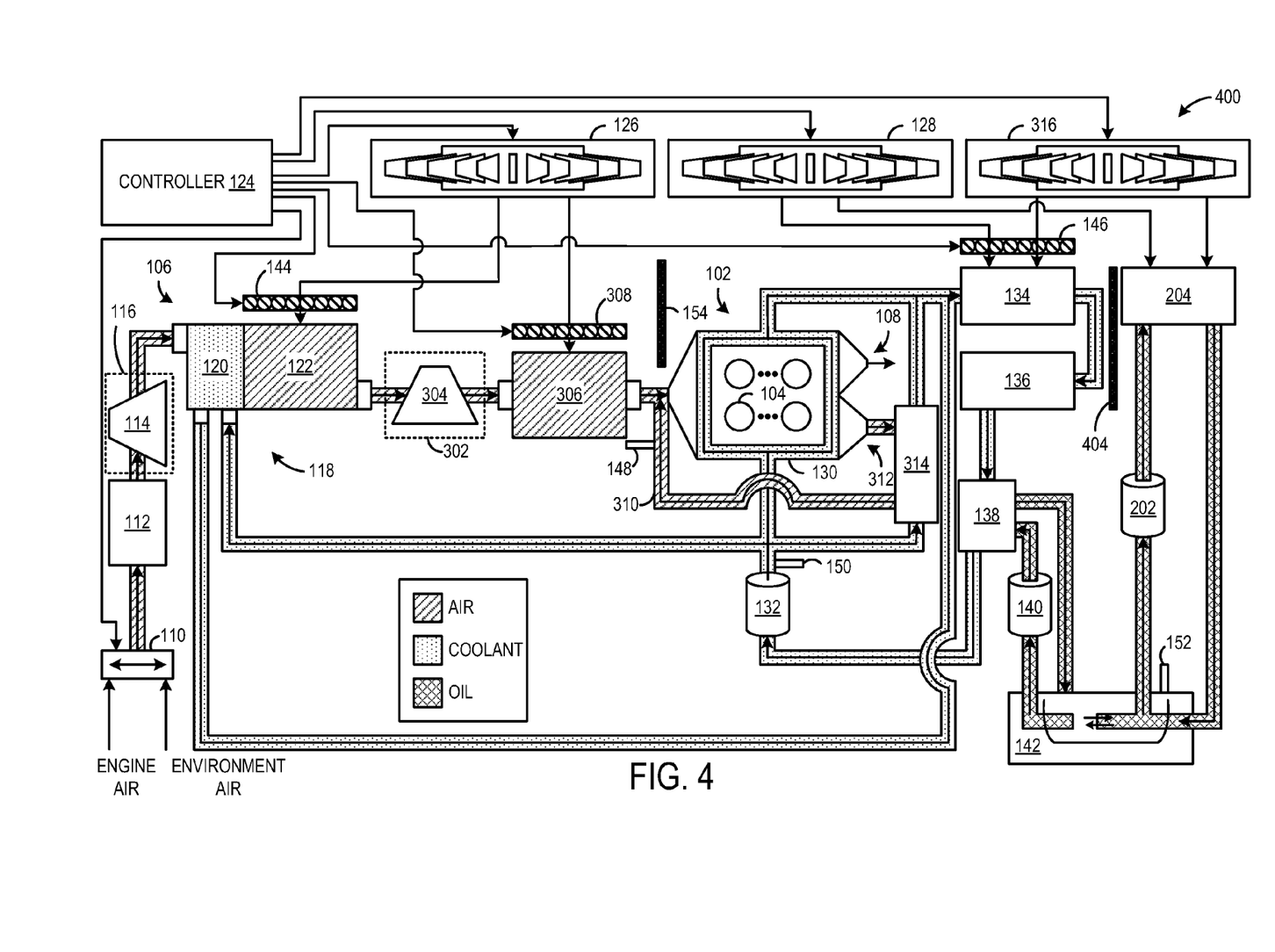
FIG. 4 schematically shows another embodiment of a thermal management system.

FIG. 4 schematically shows another embodiment of a thermal management system 400 that is operable to control temperatures of fluids and components of the internal combustion engine 102 that includes a two-stage turbocharger configuration and an expanded oil cooling circuit. The thermal management system 400 includes a three fan configuration to provide a suitable amount of air flow to cool each of the different cooling circuits in the engine 102.

Components of the thermal management system 400 that may be substantially the same as those of thermal management system 300 are identified in the same way and are described no further. However, it will be noted that components identified in the same way in different embodiments of the present disclosure may be at least partly different.

In the illustrated implementation, the first fan 126 is operable to provide air flow to the multi-stage cooling assembly 118 and the air-to-air heat exchanger 306. In some implementations, the fixed baffle 154 passively splits air flow provided by the first fan 126 evenly between the multi-stage cooling assembly 118 and the air-to-air heat exchanger 306. The second fan 128 is operable to provide air flow to the air-to-coolant radiators 134 and 136 and the air-to-oil radiator 204. The third fan 316 is operable to provide air flow to the air-to-coolant radiators 134 and 136 and the air-to-oil radiator 204. In some implementations, a second baffle 404 passively splits air flow provided by the second fan 128 evenly between the air-to-coolant radiators 134 and 136 and the air-to-oil radiator 204 and passively splits air provided by the third fan 316 evenly between the air-to-coolant radiators 134 and 136 and the air-to-oil radiator 204. Note the baffles 154 and 404 each passively split air provided by the different cooling fans to direct the air to different cooling components of the thermal management system.

In some implementations, the controller 124 is operable to adjust air flow provided by the first fan 126 based on a first operating parameter and adjust air flow provided by the second fan 128 and the third fan 316 based on a different operating parameter. For example, the controller 124 is operable to adjust air flow provided by the first fan 126 based on manifold air temperature and adjust air flow provided by the second fan 128 and the third fan 316 based on engine coolant temperature, oil temperature, or both engine coolant temperature and oil temperature. In some implementations, the controller 124 is operable to adjust air flow provided by the first fan 126 based on manifold air temperature, adjust air flow provided by the second fan 128 based on engine coolant temperature, and adjust air flow provided by the third fan 316 based on oil temperature. Accordingly, each fan may be controlled independently to provide a different amount of air flow to suitably cool each of cooling circuits of the engine 102.

In the illustrated implementation, coolant output from the air-to-coolant intercooler 120 is mixed with coolant downstream of an outlet of the coolant-to-EGR gas intercooler 314 that is downstream from the engine 102 and the water jacket 130.

Figure 5:
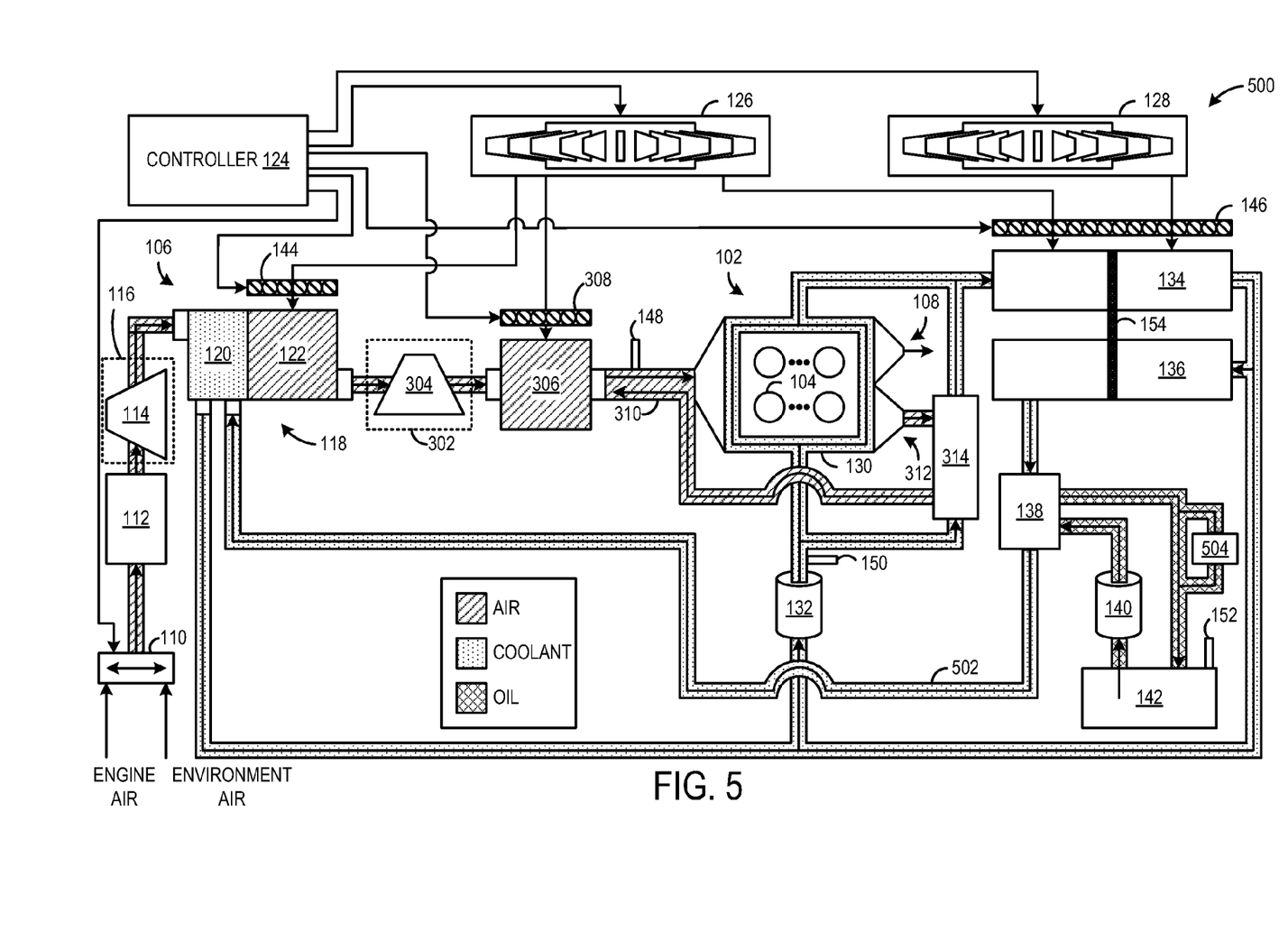
FIG. 5 schematically shows another embodiment of a thermal management system.

FIG. 5 schematically shows another embodiment of a thermal management system 500 that is operable to control temperatures of fluids and components of the internal combustion engine 102. The thermal management system 500 includes a two-stage turbocharger configuration, a modified coolant cooling circuit, and an expanded oil cooling circuit. The thermal management system 500 includes an engine coolant circuit where engine coolant that is thermally manipulated by the oil cooling circuit is directed through the multi-stage cooling assembly 118.

Components of the thermal management system 500 that may be substantially the same as those of thermal management system 400 are identified in the same way and are described no further. However, it will be noted that components identified in the same way in different embodiments of the present disclosure may be at least partly different.

The coolant-to-oil cooler 138 acts as a moderator in the oil and engine coolant circuits to drive the oil temperature toward the engine coolant temperature so that the plurality of cylinders 104 and corresponding pistons inside the engine 102 do not expand into the water jacket 130. Such moderation between engine coolant temperature and oil temperature may be particularly applicable in engine configurations in which pistons are cooled by oil jets or other application of oil for piston cooling.

Engine coolant flows from the coolant-to-oil cooler 138 to the air-to-coolant intercooler 120 to reject heat from combustion air flowing through the of the multi-stage cooling assembly 118 before returning to the coolant pump 132 to complete the engine coolant cooling circuit. By directing engine coolant to the air-to-coolant intercooler 120 as opposed to a parallel loop from the coolant pump, a different heat transfer balance can be achieved relative to the configuration shown in FIG. 3. Such a configuration facilitates a higher operational coolant temperature in the cooling circuit which results in a reduction in a desired air flow produced by the cooling fans 126 and 128. The reduction in desired air flow enables a reduction in fan horsepower since smaller fans may be implemented and/or a reduction in fuel consumption since the fans can be operated less frequently.

The oil cooling circuit is further enhanced relative to the configuration of FIG. 3. In particular, the oil cooling circuit includes thermostat 504 that is positioned in a fixed by-pass of the return line from the coolant-to-oil cooler 138 and the oil pan 142. The thermostat 504 and by-pass facilitate an increased operational oil temperature during average ambient day operating conditions. In particular, the by-pass provides additional oil travel length in the oil cooling circuit so that oil does not travel through the oil cooling components as frequently. The increase in oil temperature enabled by the thermostat and by-pass allows for a reduction in desired air flow produced by the cooling fans 126 and 128, which results in a reduction in fan size and/or fuel consumption. At higher oil temperatures, such as caused by higher ambient day operation, the thermostat 504 automatically closes to close off the by-pass in order to limit an increase in oil temperature beyond an upper temperature threshold.

Figure 6:
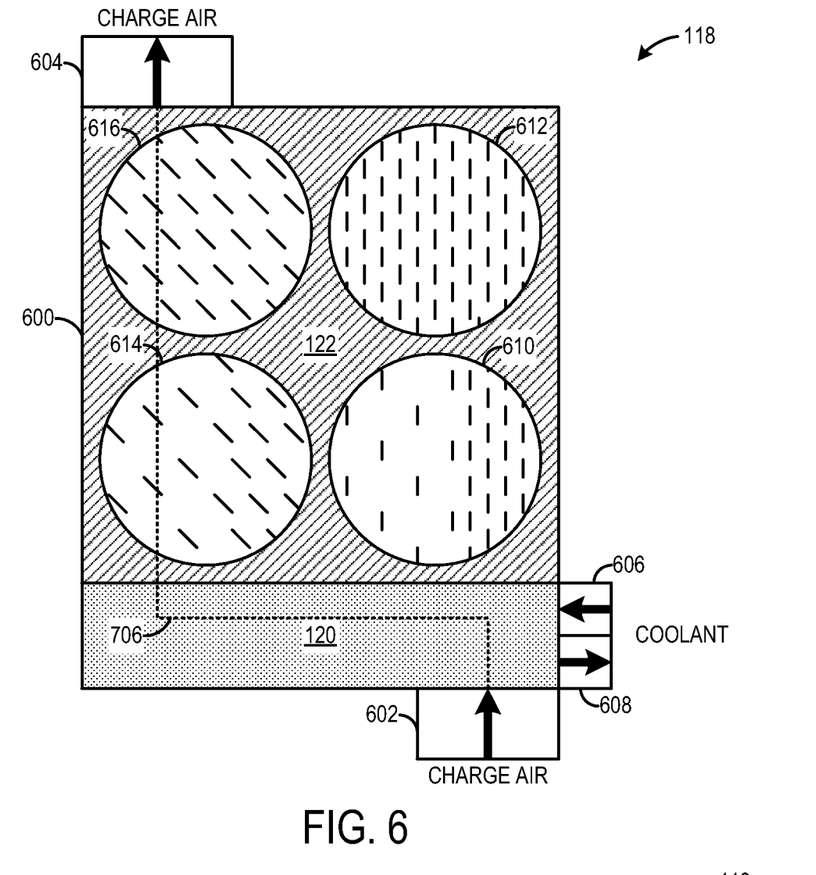
FIGS. 6-7 schematically show cross-sectional views of an embodiment of a multi-stage cooling assembly.
Figure 7:
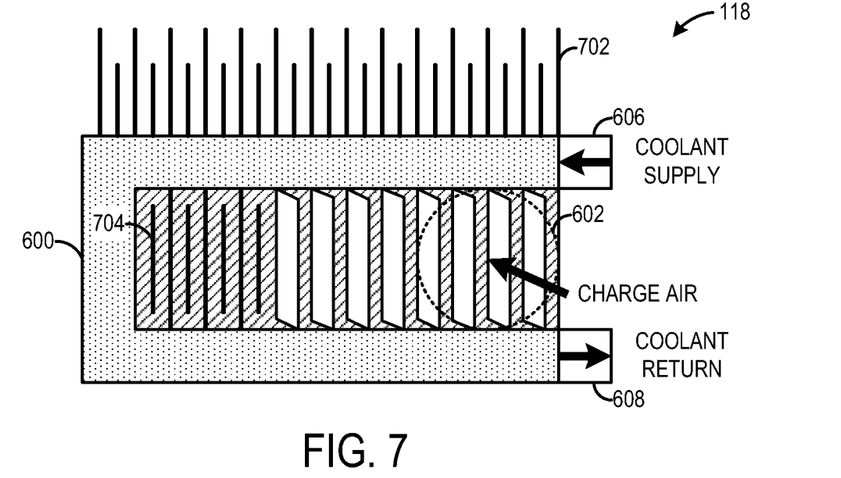

FIGS. 6-7 schematically show an embodiment of the multi-stage cooling assembly 118. The multi-stage cooling assembly comprises an air-to-coolant intercooler portion 120 in series with an air-to-air heat exchanger portion 122. By using two different fluids (i.e., engine coolant and air) to cool intake air, increased combustion air temperature control accuracy is achieved through finer tuning capabilities. Moreover, by integrating the air-to-coolant intercooler portion into the multi-stage cooling assembly, an overall pipe length is reduced relative to an air-to-air heat exchanger having the same heat rejection capability.

The multi-stage cooling assembly 118 comprises a body 600 forming an air inlet 602 and an air outlet 604. A plurality of exterior fins 702 extend outward from an exterior of the body 600. The plurality of exterior fins 702 differs as a function of the location of the plurality of exterior fins 702 relative to the exterior of the body 600. In some implementations, the plurality of exterior fins 702 differs in fin type. For example, a first region 612 of the plurality of exterior fins 702 includes flat fins that are equally spaced relative to each other and a second region 616 of the plurality of exterior fins 702 includes louvered fins that are equally spaced relative to each other. In some implementations, the plurality of exterior fins 702 differs in fin density. For example, a third region 610 of the plurality of exterior fins 702 includes flat fins that are more densely spaced moving in a right-side direction. As another example, a fourth region 614 of the plurality of exterior fins 702 includes louvered fins that are more densely spaced moving in a left-side direction. As one particular example, the plurality of exterior fins 702 varies in fin density between approximately 3.14 fins per centimeter and 4.33 fins per centimeter (or 8 fins per inch and 11 fins per inch) along the tube length of the body 600. As such, the plurality of exterior fins 702 include a first portion of exterior fins having a fin density of approximately 3.14 fins per centimeter (or 8 fins per inch) and a second portion having a fin density of approximately 4.33 fins per centimeter (or 11 fins per inch). In some implementations, the plurality of exterior fins 702 differs in both fin type and fin density.

A resulting distribution of the plurality of exterior fins creates a pressure drop in a flow of air translating across the plurality of exterior fins 702 that distributes airflow across the exterior of the body 600 in a determined amount. Fan airflow distribution can be made more uniform or distributed by varying the exterior fin type or exterior fin count along a length of the exterior of the body 600 to increase overall heat transfer from the air-to-air heat exchanger portion 122. For example, fins with higher and lower unit fan airflow pressure drops are arranged to provide a passive distribution of the airflow from the fan over the exterior of the body 600 of the air-to-air heat exchanger portion 122.

In some implementations, fan cooling air is not distributed uniformly, but instead is distributed to provide the maximum heat transfer based on the physical heat transfer between circuit fluids (e.g., combustion air and fan air flow) based on temperature difference. For example, high initial temperature differences between fluids may or may not need higher or lower airflow rates to achieve maximum heat transfer.

The air-to-coolant intercooler portion 120 is positioned in an interior of the body 600 and adjacent the air inlet 602. The air-to-coolant intercooler portion 120 includes a coolant supply inlet 606 and a coolant return outlet 608. The air-to-coolant intercooler portion 120 spans substantially an interior circumference of the body 600 creating a large surface area to interact with combustion air flowing through the center of the air-to-coolant intercooler portion 120. In other words, the air-to-coolant intercooler portion 120 forms a cooling jacket in a portion of the body 600 of the multi-stage cooling assembly 118. Based on operating conditions, the air-to-coolant intercooler portion 120 provides combustion air heating or cooling. For example, during low engine load and low ambient temperature conditions, engine coolant flowing through the air-to-coolant intercooler portion 120 heats the combustion air. As another example, during higher engine load and higher ambient temperature conditions, the air-to-coolant intercooler portion 120 acts as a first in series cooler with the air-to-air heat exchanger portion 122 providing additional cooling.

The air-to-air heat exchanger portion 122 includes a plurality of interior fins 704 that extend inward from the interior of the body 600. The plurality of interior fins 704 differ as a function of the location of the plurality of interior fins 704 relative to the interior of the body 600. In some implementations, the plurality of interior fins 704 differs in fin type. For example, the plurality of interior fins 704 includes louvered fins and flat fins. In some implementations, the plurality of interior fins 674 differs in fin density. As one particular example, the plurality of interior fins 704 varies in fin density between approximately 3.93 fins per centimeter and 6.69 fins per centimeter (or 10 fins per inch and 17 fins per inch). As such, the plurality of interior fins 704 include a first portion of interior fins having a fin density of approximately 3.93 fins per centimeter (or 10 fins per inch) and a second portion having a fin density of approximately 6.69 fins per centimeter (or 17 fins per inch). For example, the first portion may include 25% of the plurality of interior fins 704 and the second portion may include 75% of the plurality of interior fins 704. In some implementations, the plurality of interior fins 704 differs in both fin type and fin density. The plurality of interior fins 704 differ in fin type, fin density, or both fin type and fin density to direct combustion air through an internal path 706 resulting in a flow of combustion air translating across only a portion of the interior of the body, during an operating condition.

In the illustrated implementation, the internal path 706 of air flow is formed by positioning louvered fins on a right side of the interior of the body to direct air entering the air inlet 602 to the left-side of the body 600, across the width of the air-to-coolant intercooler portion 120. Straight fins are positioned to allow air to travel the length of the body 600 along the left-side to the air outlet 604. Note the internal path 706 of air flow may be formed only under some conditions. For example, combustion air is directed along the internal path 706 under low air flow conditions, such as at engine idle. This passive air flow direction avoids overcooling the combustion air after heating by the water based intercooler during low engine load and low ambient operation to maintain the combustion air temperature into the engine when there is not compression heating from the turbocharger compressor. The internal path 706 of air flow allows only a portion of the air-to-air heat exchanger portion 122 to be used for heat transfer since the combustion air does not contact the entire interior surface area of the body 600. On the other hand, once combustion air increases above a threshold flow rate, air flow may bypass the internal path 706 and flow through other portions of the interior of the body 600 to promote increased heat rejection of the combustion air.

Figure 8:
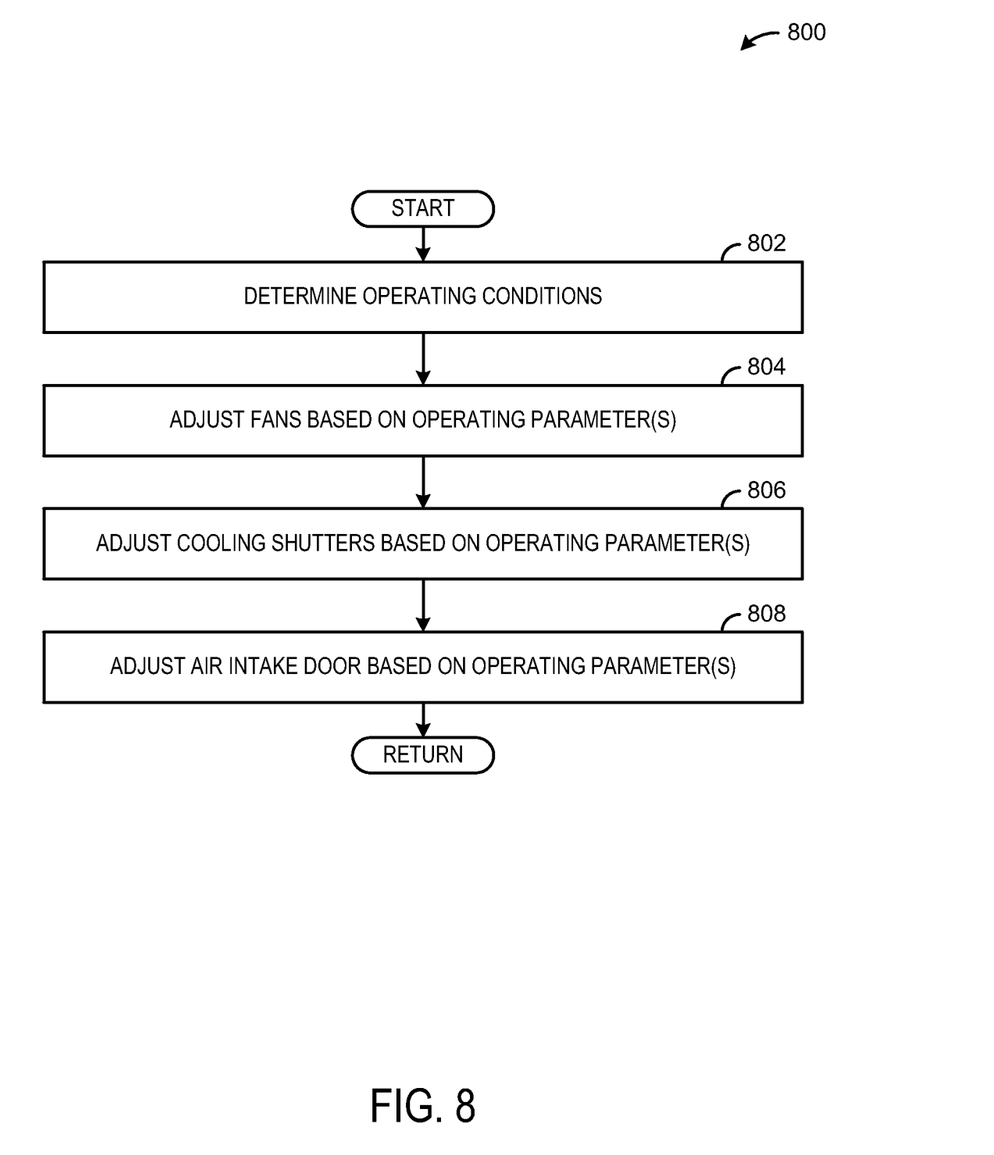
FIG. 8 shows a flow diagram of an embodiment of a thermal management method.

FIG. 8 shows a flow diagram of an embodiment of a thermal management method 800. In one example, the thermal management method 800 is executable by the controller 124 shown in FIGS. 1-5. At 802, the method 800 includes determining operating conditions associated with the engine. Determining operating conditions includes receiving sensor signals indicative of operating parameters. For example, sensor signals that are received by the controller 124 include manifold air temperature, engine coolant temperature, oil temperature, ambient air temperature, EGR gas temperature, engine speed, engine load, boost pressure, etc. Determining operating conditions may include determining a state of different components. For example, component states that are determined by the controller 124 include fan operation state, cooling shutter position, coolant pump operation state, oil pump operation state, turbocharger position, air intake door position, bypass valve position, engine position, etc.

At 804, the method 800 includes adjusting fans based on operating parameters(s). Adjusting fans includes adjusting air flow provided by fans. In some implementations, adjusting fans is a binary operation. For example, the controller 124 turns a fan on or off based on an operating parameter. In some implementations, adjusting fans includes increasing or decreasing air flow provided by a fan. For example, the controller 124 adjusts air flow provided by a fan by adjusting a motor speed on the fan. As another example, the controller 124 adjusts air flow provided by a fan by adjusting a fan blade pitch of the fan. By adjusting air flow provided by different fans based on the same operating parameter, thermal management is performed in a simplified manner.

In some implementations, adjusting fans includes adjusting a plurality of fans based on the same operating parameter. For example, the controller 124 adjusts air flow provided by the first fan 126 and the second fan 128 in FIG. 1 based on manifold air temperature. In some implementations, fans are adjusted independently based on different operating parameters. In one particular example, adjusting fans includes adjusting air flow provided by a first fan based on a first operating parameter, and adjusting air flow provided by a second fan based on a second operating parameter different from the first operating parameter. For example, the controller 124 adjusts air flow provided by the first fan 126 based manifold air temperature and adjusts air flow provided by the second fan 128 based on engine coolant temperature. By adjusting air flow provided by different fans independently based on different operating parameters, different levels of cooling are provided to different cooling circuits to meet their individual heat rejection needs. Accordingly, thermal control accuracy is increased.

At 806, the method 800 includes adjusting cooling shutters based on operating parameters(s). As discussed above, cooling shutters are positioned between air cooled components and fans in the thermal management system. Adjusting cooling shutters includes opening a cooling shutter to allow air flow to reach an air cooled component, closing a cooling shutter to prevent air flow from reaching an air cooled component, or adjusting a cooling shutter to a position between opened and closed to throttle air flow reaching a cooling component. In some implementations, adjusting cooling shutters includes adjusting a plurality of cooling shutter based on the same operating parameter. For example, the controller 124 closes the first cooling shutter 144 and the second cooling shutter 146 in FIG. 1 as long as combustion air is below a temperature threshold to prevent overcooling of the combustion air. As another example, the controller 124 closes the first and second cooling shutters during low engine load conditions when combustion air flow is low and turbocharger compression is low to prevent overcooling of the combustion air.

In some implementations, cooling shutters are adjusted independently based on different operating parameters. In one particular example, a first cooling shutter to control air flow provided to a multi-stage cooling assembly is adjusted based on a first operating parameter, and a second cooling shutter to control air flow provided to an air-to-coolant radiator is adjust based on a second operating parameter different than the first operating parameter. For example, the controller 124 adjusts the first cooling shutter based on manifold air temperature and adjusts the second cooling shutter based on engine coolant temperature. As another example, the controller 124 closes the first cooling shutter during a low engine temperature condition, closes the second cooling during a low engine coolant temperature condition, and closes the first cooling shutter and the second cooling shutter during a low engine load condition. By adjusting different cooling shutters independently based on different operating parameters, different levels of cooling are provided to different cooling circuits to meet their individual heat rejection needs. Accordingly, thermal control accuracy is increased.

At 808, the method 800 includes adjusting an air intake door based on operating parameter(s). In some implementations, the air intake door 110 of FIG. 1 is adjusted based on ambient air temperature and manifold air temperature. For example, when ambient temperature and manifold air temperature are below respective temperature thresholds, the controller 124 adjusts the air intake door to a first position that connects an air intake passage with an engine compartment to provide intake air from the engine compartment to the air intake passage. The warmer air provided from the engine compartment promotes quicker heating of the combustion air relative to the cooler ambient environment air. Correspondingly, once the manifold air temperature has increased beyond the temperature threshold, the controller 124 adjusts the air intake door to a second position that connects the air intake passage with the environment outside of the engine compartment to provide ambient environment air to the air intake passage. The cooler ambient air provides greater charge density and engine cooling relative to air in the engine compartment.

It will be appreciated that in some implementations the method 800 may omit one or more of the above described steps without departing from the scope of the present disclosure.

In the appended claims, the terms "including" and "in which" are used as the plain-English equivalents of the respective terms "comprising" and "wherein." Moreover, in the following claims, the terms "first," "second," "$3^{rd}$,"

"upper," "lower," "bottom," "top," "up," "down," etc. are used merely as labels, and are not intended to impose numerical or positional requirements on their objects. As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A thermal management system, comprising:
an air intake structure defining an air intake passage therethrough coupled to a plurality of cylinders in an engine;
a multi-stage cooling assembly, positioned in the air intake passage, including an air-to-coolant intercooler for cooling intake air and an air-to-air heat exchanger for cooling intake air;
an air-to-coolant radiator fluidly coupled with the air-to-coolant intercooler of the multi-stage cooling assembly;
a first fan operable to provide air flow to the multi-stage cooling assembly and the air-to-coolant radiator;
a second fan operable to provide air flow to the air-to-coolant radiator; and
a baffle to passively split air flow provided by the first fan unevenly to the multi-stage cooling assembly and the air-to-coolant radiator.

2. The system of claim 1, further comprising:
a controller operable to adjust air flow provided by the first fan, adjust air flow provided by the second fan, or adjust air flow provided by the first fan and adjust air flow provided by the second fan based on an operating parameter.

3. The system of claim 2, wherein the operating parameter is manifold air temperature.

4. The system of claim 2, wherein the operating parameter is engine coolant temperature.

5. The system of claim 2, wherein the controller is operable to adjust a speed of the first fan to adjust air flow provided by the first fan, and operable to adjust a speed of the second fan to adjust air flow provided by the second fan.

6. The system of claim 2, wherein the controller is operable to adjust a fan blade pitch of the first fan to adjust air flow provided by the first fan, and operable to adjust a fan blade pitch of the second fan to adjust air flow provided by the second fan.

7. The system of claim 2, further comprising:
a first cooling shutter, positioned between the multi-stage cooling assembly and the first fan, adjustable to adjust air flow provided to the multi-stage cooling assembly;
a second cooling shutter, positioned between the air-to-coolant radiator and the first fan and the second fan, adjustable to adjust air flow provided to the air-to-coolant radiator; and
the controller being operable to adjust the first cooling shutter to control air flow provided to the multi-stage cooling assembly, and operable to adjust the second cooling shutter to adjust air flow provided to the air-to-coolant radiator independent of adjusting the first cooling shutter.

8. The system of claim 1, further comprising:
an air intake door, coupled to the air intake structure, adjustable to at least a first position that connects the air intake passage with an engine compartment to provide intake air from the engine compartment to the air intake passage, and a second position that connects the air intake passage with environment outside of the engine compartment to provide ambient environment air to the air intake passage.

9. A thermal management system, comprising:
an air intake structure defining an air intake passage therethrough coupled to a plurality of cylinders in an engine;
a multi-stage cooling assembly, positioned in the air intake passage, including an air-to-coolant intercooler for cooling intake air and an air-to-air heat exchanger for cooling intake air;
an air-to-coolant radiator fluidly coupled with the air-to-coolant intercooler of the multi-stage cooling assembly;
a first fan operable to provide air flow to the multi-stage cooling assembly and the air-to-coolant radiator;
a second fan operable to provide air flow to the air-to-coolant radiator;
a controller operable to adjust air flow provided by the first fan, adjust air flow provided by the second fan, or adjust air flow provided by the first fan and adjust air flow provided by the second fan based on an operating parameter;
a first cooling shutter, positioned between the multi-stage cooling assembly and the first fan, adjustable to adjust air flow provided to the multi-stage cooling assembly; and
a second cooling shutter, positioned between the air-to-coolant radiator and the first fan and the second fan, adjustable to adjust air flow provided to the air-to-coolant radiator,
the controller being operable to adjust the first cooling shutter to control air flow provided to the multi-stage cooling assembly, and operable to adjust the second cooling shutter to adjust air flow provided to the air-to-coolant radiator independent of adjusting the first cooling shutter, and wherein the controller is operable to close the first cooling shutter when an engine temperature is below a first designated threshold, close the second cooling shutter when an engine coolant temperature is below a second designated threshold, and close the first cooling shutter and the second cooling shutter when a load of the engine is below a third designated threshold.

10. A thermal management method for an engine, the method comprising:
adjusting air flow provided by a first fan to a multi-stage cooling assembly positioned in an air intake structure defining an air intake passage therethrough coupled to a plurality of cylinders of the engine, the multi-stage cooling assembly including an air-to-coolant intercooler for cooling intake air and an air-to-air heat exchanger for cooling intake air and an air-to-coolant radiator fluidly coupled with the air-to-coolant intercooler of the multi-stage cooling assembly based on a first operating parameter;

adjusting air flow provided by a second fan to provide air flow to the air-to-coolant radiator based on a second operating parameter different from the first operating parameter;

when an engine temperature is below a first designated threshold, closing a first cooling shutter positioned between the multi-stage cooling assembly and the first fan to adjust air flow provided to the multi-stage cooling assembly;

when an engine coolant temperature is below a second designated threshold, closing a second cooling shutter positioned between the air-to-coolant radiator and the first fan and the second fan to adjust air flow provided to the air-to-coolant radiator; and when a load of the engine is below a third designated threshold, closing the first cooling shutter and the second cooling shutter.

11. The method of claim 10, wherein the first operating parameter is manifold air temperature and the second operating parameter is engine coolant temperature.

12. The method of claim 10, further comprising:

adjusting an air intake door coupled to the air intake structure, between a first position that connects the air intake passage with an engine compartment to provide intake air from the engine compartment to the air intake passage, and a second position that connects the air intake passage with environment outside of the engine compartment to provide ambient environment air to the air intake passage based on the first operating parameter.

13. A thermal management system, comprising:

an air intake structure defining an air intake passage therethrough coupled to a plurality of cylinders in an engine;

a multi-stage cooling assembly, positioned in the air intake passage, including an air-to-coolant intercooler for cooling intake air and an air-to-air heat exchanger for cooling intake air;

an air-to-coolant radiator fluidly coupled with the air-to-coolant intercooler of the multi-stage cooling assembly;

a first fan operable to provide air flow to the multi-stage cooling assembly and the air-to-coolant radiator;

a second fan operable to provide air flow to the air-to-coolant radiator;

a baffle to passively split air flow provided by the first fan unevenly to the multi-stage cooling assembly and the air-to-coolant radiator; and a controller operable to adjust air flow provided by the first fan, adjust air flow provided by the second fan, or adjust air flow provided by the first fan and adjust air flow provided by the second fan based on an operating parameter.

14. The system of claim 13, wherein the controller is operable to adjust air flow provided by the first fan based on a first operating parameter, and adjust airflow provided by the second fan based on a second operating parameter different from the first operating parameter.

* * * * *